United States Patent [19]

McGrow

[11] Patent Number: 4,721,574

[45] Date of Patent: Jan. 26, 1988

[54] WATER TREATMENT

[75] Inventor: George McGrow, West Yorkshire, England

[73] Assignee: Allied Colloids Ltd., England

[21] Appl. No.: 866,071

[22] Filed: May 21, 1986

[30] Foreign Application Priority Data

May 22, 1985 [GB] United Kingdom ............... 8512937

[51] Int. Cl.$^4$ .............................................. C02F 1/56
[52] U.S. Cl. ..................................... 210/734; 210/754
[58] Field of Search ............... 210/725, 727, 728, 732, 210/734–736, 754, 756

[56] References Cited

U.S. PATENT DOCUMENTS

| | | | |
|---|---|---|---|
| 3,409,547 | 11/1968 | Dajani | 210/735 |
| 3,738,945 | 6/1973 | Panzer et al. | 210/736 |
| 3,897,333 | 7/1975 | Field et al. | 210/734 |
| 3,989,143 | 11/1976 | Broussard | 210/754 |
| 4,098,693 | 7/1978 | Tonkyn et al. | 210/736 |
| 4,137,165 | 1/1979 | Coscia et al. | 210/734 |
| 4,160,731 | 7/1979 | Doyle | 210/901 |

*Primary Examiner*—Peter Hruskoci
*Attorney, Agent, or Firm*—Ostrolenk, Faber, Gerb & Soffen

[57] ABSTRACT

Polymers having recurring units derived from monomers of formula I $$CH_2=C(R^1) CONHR^2NR^3R^4 \qquad I$$

wherein $R^1$ is hydrogen or methyl, $R^2$ is straight or branched chain $C_{2-8}$ alkylene having at least 2 carbon atoms in the backbone and $R^3$ and $R^4$ are independently selected from $C_{1-4}$ alkyl, most preferably quaternized dimethylaminopropyl methacrylamide polymers, for instance copolymerized with acrylamide, are used as flocculating agents in processes where the polymer is present during part at least of the process in solution in the presence of free chlorine.

17 Claims, No Drawings

WATER TREATMENT

It is often necessary to flocculate suspended solids from a chlorinated aqueous medium by adding a flocculating agent to that aqueous medium. For instance this may be required in the production of drinking water, in the provision of adequately pure water to cooling towers and air conditioning systems, in the treatment of sewage effluent and in the supply of water to swimming pools.

High molecular weight water-soluble polymers may be used as flocculating agents for aqueous media and a choice between anionic and cationic polymers will be made having regard to the nature of the aqueous medium. For instance cationic polymers are often preferred where the water has high colour or other organic content and, in particular, where the water has been treated with relatively low doses of alum or other polyvalent metal. The use of higher doses of polyvalent metal might make anionic flocculants suitable but would have the disadvantage of increasing the residual metal content of the water.

Typical anionic flocculants, for instance copolymers of acrylamide and sodium polyacrylate, are relatively unaffected by chlorination.

Typical cationic flocculants include salts, especially quaternary ammonium salts, of dialkyl aminoalkyl (meth)-acrylates and -acrylamides. Typical cationic flocculants tend to be sensitive to chlorination, even at quite low amounts of free chlorine, with resultant reduction in flocculant performance.

One particular range of cationic polymers known to be relatively resistant to chlorination is based on DADMAC, that is to say polymers containing units of diallyl dimethyl ammonium chloride, often copolymerised with acrylamide. Unfortunately the DADMAC polymers cannot conveniently be produced in solid form and, especially, cannot easily be made to the very high molecular weights that are generally regarded as optimum for polymeric flocculants.

Various specialised cationic polymers have been proposed for various purposes. For instance, in U.S. Pat. No. 4,160,731 it is proposed to use a copolymer of acrylamide and the methyl chloride salt of dimethylaminopropyl methacrylamide (DMAPMA) for dewatering sewage sludges that have been disinfected with lime. It is stated that in the routine processing of sewage sludges the choice of efficient flocculants to provide sludge dewatering is very limited and that this particular polymer gives improved results in sludges having pH above 12.

We have now found that a particular class of cationic polymers are effective flocculants even in the presence of relatively high levels of chlorination of the aqueous medium.

According to the invention, suspended solids are flocculated from an aqueous medium by adding dissolved polymeric flocculating agent, the polymeric flocculating agent is in solution during the process in the presence of free chlorine and the polymer has recurring units derived from monomers of formula I $$CH_2=C(R^1)CONHR^2NR^3R^4 \qquad I$$

wherein $R^1$ is hydrogen or methyl, $R^2$ is straight or branched chain $C_{2-8}$ alkylene having at least 2 carbon atoms in the backbone and $R^3$ and $R^4$ are independently selected from $C_{1-4}$ alkyl. $R^1$ is preferably methyl and $R^2$ may be for instance ethylene, isopropylene, t-butylene or 2-ethyl-1,6-hexylene, but is preferably 1,3-propylene. $R^3$ and $R^4$ are usually independently selected from methyl and ethyl. The preferred recurring unit is derived from dimethylaminopropyl methacrylamide (DMAPMA).

The specified recurring units may be in the form of a partial or complete acid salt or a partial or complete quaternary ammonium salt, that is to say some or all of the recurring units may be in the form of an acid salt or a quaternary ammonium salt. Suitable acid salts are formed with organic or inorganic acids, especially sulphuric or hydrochloric acid. Suitable quaternising groups are $C_{1-4}$—alkyl or —hydroxyalkyl, such as methyl, ethyl, propyl or 2-hydroxy ethyl, preferably methyl or ethyl. Suitable counterions are chloride, sulphate, methyl sulphate, acetate and nitrate. The recurring unit may for instance be quaternised with ethylene oxide or epichlorhydrin in an acid, to give the N-(2-hydroxyethyl) derivative. Preferred quaternising compounds are methyl chloride and dimethyl sulphate.

The polymer may be a homopolymer of the specified unit but is preferably a copolymer with other copolymerisable ethylenically unsaturated monomers, generally other acrylic monomers, provided these other monomers do not significantly detract from the required properties of the polymer. The comonomers are usually non-ionic. Suitable comonomers include vinyl pyrrollidone, N-vinyl N-methyl acetamide, methacrylamide or, preferably, acrylamide. Generally the polymer is formed from a mixture of from 5 to 70%, preferably 10 to 50% and most preferably 15 to 40% by weight DMAPMA or other specified monomer, together with one or more comonomers.

Varying the proportion of non-ionic comonomer in the polymer, thereby varying the ionic charge of the polymer, provides polymers having differing ionic content which may be useful in different environments.

The polymer must be substantially soluble in water and is generally a substantially linear polymer having molecular weight preferably above 1 million, preferably above 2 million and often above 5 million. The intrinsic viscosity of the polymers can be, for instance, above 4, e.g., 8 to 15, dl/g. These high molecular weights are advantageous as high molecular weight polymers tend to have better properties as flocculants than lower molecular weight polymers.

The polymers used in the invention may be made by conventional techniques, for instance gel polymerisation or, preferably, by reverse phase polymerisation, optionally followed by azeotropic distillation to remove water and, if the particle size is large, separation of the resultant beads from oil. The polymer may be provided to the user as a solid, for instance as dry beads or as dried comminuted gel, or as a dispersion of polymer particles in oil (e.g., containing at least 40% dry polymer in oil) or as a solution in water. Before use, the polymer will be converted to the form of a dilute aqueous solution in conventional manner.

The polymers used in the invention have the advantage over conventional cationic flocculants, such as quaternary ammonium salts of dialkylaminoalkyl acrylates, that they have improved performance in chlorinated aqueous media, even at quite high chlorination concentrations. They also have improved properties compared to DADMAC polymers, and in particular they can have higher molecular weight and can be supplied in solid, and therefore much more concentrated, form.

The concentration of free chlorine dissolved in the water in which the polymer is in solution is generally above 0.5 ppm, usually above 1 or 2 ppm and often above 5 ppm and can be up to 20 ppm or higher. The free chlorine may be present during the entire process or during part only of the process, for instance only during the make-up of the initial polymer solution.

The polymer can be in solution in the presence of dissolved chlorine as a result of making the polymer up initially as a solution in chlorinated water and adding this solution to the aqueous medium (the solids of which may absorb some or all of the free chlorine). For instance the aqueous medium that is to be flocculated may be waste water, for instance a sewage sludge, and the water used to make up the flocculant solution for use in various clarification, filtration, and other dewatering steps, may have been chlorinated, for instance as a result of having been recycled from a sewage dewatering process that includes a stage in which dissolved chlorine is incorporated in an amount such that there is free chlorine in the polymer solution. The amount of polymer will be conventional for the particular flocculation process that is being conducted, e.g., 0.01 to 3% based on suspended solids. The concentration of the polymer in the chlorinated solution will be typical, e.g., 0.01% to 1% by weight.

The invention is of particular value where the aqueous medium that is being flocculated contains the free chlorine, generally as a result of being deliberately chlorinated, for instance by treatment by a chlorine source such as for instance chlorocyanurate, hypochlorite or chlorine peroxide. The polymer may be made up as a solution in chlorinated or chlorine-free water.

The process is of particular value in the clarification of low solids, chlorinated, suspensions (e.g., below 1000 ppm suspended solids), e.g., in the production of drinking or other potable water and also in swimming pools and especially in recirculating water systems such as cooling towers and air conditioning systems, where high concentrations of chlorine are necessary to prevent algal growth. The amount of polymer may be conventional, e.g., 0.01 to 2 ppm based on the aqueous medium. The initial suspended solids may be up to 1000 ppm and the final suspended solids below 10 ppm.

EXAMPLE

To compare the performance of various types of polymer at different levels of chlorination, the required dose of chlorine was added to a 1 liter sample of Bradford (U.K.) tap water followed by sodium bicarbonate to give a coagulation pH of 7 and 60 ppm aluminium sulphate as $Al_2(SO_4)_3.16H_2O$. The sample was stirred for two minutes and then the test polymer was added dissolved in water. After further stirring, the samples were allowed to settle for 2 minutes and the turbidity of the supernatant was measured. Polymer performance was quantified using the equation $$P = \frac{(T_o - T_{pc})100}{(T_o - T_{po})}$$

where P is percentage performance, To is turbidity obtained with alum alone, Tpo is turbidity obtained with alum and polymer in absence of chlorine and Tpc is turbidity obtained with alum and polymer in the presence of chlorine.

Four polymers were tested, all at a dosage of 0.3 ppm, as follows (wherein the proportions of the monomers are by weight)

A. 23:77 dimethylaminoethyl acrylate quaternised with methyl chloride:acrylamide.

B. 25:75 dimethylaminoethyl methacrylate quaternised with methyl chloride:acrylamide.

C. 26:74 methacryl-amidopropyl trimethyl ammonium chloride:acrylamide.

D. 20:80 sodium acrylate:acrylamide. The results are shown in the Table.

| Free Chlorine Content (ppm) | 0 | 2 | 5 | 10 |
|---|---|---|---|---|
| Polymer A | 100 | 63 | 54 | 40 |
| Polymer B | 100 | 80 | 78 | 73 |
| Polymer C | 100 | 94 | 96 | 84 |
| Polymer D | 100 | 99 | 96 | 91 |

This shows that the anionic flocculant (D) is substantially unaffected by chlorine, that an example of a cationic polymer useful in the present invention (C) is very slightly affected and that the activity of other known cationic flocculants (A, B) is severely decreased by free chlorine. Accordingly this demonstrates that, when a cationic flocculant is required, the polymers defined in the invention are better than conventional cationic flocculants.

The intrinsic viscosity of the polymer used in the invention (polymer C) was 12.3 dl/g.

I claim:

1. A process for flocculating suspended solids from an aqueous medium containing the suspended solids comprising adding an effective amount of a polymeric flocculating agent substantially soluble in water, to said aqueous medium, flocculating said suspended solids and separating the flocculated solids from the aqueous medium to produce a clarified aqueous medium, in which the flocculating agent, during part at least of the process is dissolved in an aqueous solution containing above 0.5 ppm free chlorine, and in which the polymer has at least 5% by weight of recurring units derived from monomers of th formula $CH_2=C(R^1)CONHR^2NR^3R^4$ wherein $R^1$ is hydrogen or methyl, $R^2$ is straight or branched chain $C_{2-8}$ alkylene having at least 2 carbon atoms in the backbone between the two nitrogen atoms to which it is attached and $R^3$ and $R^4$ are independently selected from $C_{1-4}$ alkyl, the polymer having a molecular weight of above one million.

2. A process according to claim 1 in which $R^2$ is 1,3-propylene and $R^3$ and $R^4$ are independently selected from methyl and ethyl.

3. A process according to claim 1 in which $R^1$, $R^3$ and $R^4$ are methyl and $R^2$ is 1,3-propylene.

4. A process according to claim 1 in which the polymer is present as an acid salt or quaternary ammonium salt.

5. A process according to claim 1 in which the polymer is present as the methyl chloride or dimethyl sulphate quaternary ammonium salt.

6. A process according to claim 1 in which the polymer is formed of 5% to 70% by weight of the monomers of said formula and 95% to 30% by weight of other copolymerisable ethylenically unsaturated monomers.

7. A process according to claim 1 in which the polymer is a copolymer of 15% to 40% by weight of the monomers of said formula with 85% to 60% by weight acrylamide.

8. A process according to claim 1 in which the aqueous medium is a chlorinated aqueous medium containing free chlorine and having a suspended solids content of below 1000 ppm.

9. A process according to claim 8 in which the clarified aqueous medium is potable water.

10. A process according to claim 1 in which the clarified aqueous medium is potable water.

11. A process according to claim 1, in which the polymeric flocculating agent is added to said aqueous medium in the form of an aqueous solution containing water separated from a different quantity of said medium.

12. A process for flocculating suspended solids from water containing the suspended solids by adding an effective amount of a polymeric flocculating agent substantially soluble in water, to said water, flocculating said suspended solids and separating the flocculated solids from the water to produce a clarified aqueous medium, in which the flocculating agent, during part at least of the process is dissolved in an aqueous solution containing above 0.5 ppm free chlorine, and in which the polymer has at least 5% by weight of recurring units derived from monomers of the formula $CH_2=C(R^1)CONHR^2NR^3R^4$ wherein $R^1$ is hydrogen or methyl, $R^2$ is straight or branched chain $C_{2-8}$ alkylene having at least 2 carbon atoms in the backbone between the two nitrogen atoms to which it is attached and $R^3$ and $R^4$ are independently selected from $C_{1-4}$ alkyl, the polymer having a molecular weight of above one million, and recovering potable water from said clarified aqueous medium.

13. A process according to claim 12 in which $R^2$ is 1,3-propylene and $R^3$ and $R^4$ are independently selected from methyl and ethyl.

14. A process according to claim 12 in which $R^1$, $R^3$ and $R^4$ are methyl and $R^2$ is 1,3-propylene.

15. A process according to claim 12 in which the polymer is present as an acid salt or quaternary ammonium salt.

16. A process according to claim 12 in which the polymer is present as the methyl chloride or dimethyl sulphate quaternary ammonium salt.

17. A process according to claim 12 in which the aqueous medium is chlorinated aqueous medium containing free chlorine and having a suspended solids content of below 1000 ppm.

* * * * *